(12) United States Patent
Soletsky et al.

(10) Patent No.: US 9,465,100 B2
(45) Date of Patent: Oct. 11, 2016

(54) SYSTEM AND METHOD FOR A DIRECTABLE COUNTERMEASURE WITH DIVERGENT LASER

(71) Applicant: ELBIT SYSTEMS OF AMERICA, LLC, Fort Worth, TX (US)

(72) Inventors: Philip Soletsky, Brookline, NH (US); Jan Stephan Lundquist, Merrimack, NH (US)

(73) Assignee: Elbit Systems of America, LLC, Fort Worth, TX (US)

( * ) Notice: Subject to any disclaimer, the term of this patent is extended or adjusted under 35 U.S.C. 154(b) by 195 days.

(21) Appl. No.: 14/316,508

(22) Filed: Jun. 26, 2014

(65) Prior Publication Data

US 2015/0323656 A1 Nov. 12, 2015

Related U.S. Application Data

(60) Provisional application No. 61/839,700, filed on Jun. 26, 2013.

(51) Int. Cl.
*G01S 7/495* (2006.01)
*F41H 13/00* (2006.01)
*F41G 7/22* (2006.01)

(52) U.S. Cl.
CPC ............. *G01S 7/495* (2013.01); *F41G 7/224* (2013.01); *F41H 13/0056* (2013.01)

(58) Field of Classification Search
CPC ..... G01S 7/495; F41G 7/224; F41H 13/0056
USPC .......................................................... 89/1.11
See application file for complete search history.

(56) References Cited

U.S. PATENT DOCUMENTS

| | | | | |
|---|---|---|---|---|
| 5,198,607 | A * | 3/1993 | Livingston | F41H 13/0062 89/1.11 |
| 5,747,720 | A * | 5/1998 | Schnurr | F41H 13/0062 250/347 |
| 7,046,187 | B2 * | 5/2006 | Fullerton | F41H 11/00 342/118 |
| 7,946,207 | B1 * | 5/2011 | Porter | F41H 13/0062 342/54 |
| 8,698,667 | B2 * | 4/2014 | Aragones | G01S 7/495 244/3.1 |
| 8,927,935 | B1 * | 1/2015 | Meline | F41H 13/0062 250/340 |
| 2006/0000988 | A1 * | 1/2006 | Stuart | G01S 7/495 250/504 R |
| 2007/0075182 | A1 * | 4/2007 | Fetterly | F41G 7/224 244/3.16 |
| 2011/0188031 | A1 * | 8/2011 | Aphek | F41G 7/224 356/138 |
| 2014/0147116 | A1 * | 5/2014 | Krupkin | F41G 7/224 398/39 |

* cited by examiner

*Primary Examiner* — Reginald Tillman, Jr.
(74) *Attorney, Agent, or Firm* — Conley Rose, P.C.

(57) ABSTRACT

A system includes a threat warning system and an countermeasure system. The threat warning system generates threat data that includes at least a threat coordinate value. The countermeasure system includes a wide-angle laser beam director and the infrared counter measure system receives the threat data including the threat coordinate value from the threat warning system and causes the beam director to direct a divergent laser beam based on the threat coordinate value.

16 Claims, 3 Drawing Sheets

104

104

SYSTEM AND METHOD FOR A DIRECTABLE COUNTERMEASURE WITH DIVERGENT LASER

CROSS-REFERENCE TO RELATED APPLICATION

The present application claims priority to U.S. Provisional Patent Application No. 61/839,700 filed on Jun. 26, 2013, which is hereby incorporated herein by reference.

BACKGROUND

Jamming a reticle-based infrared homing missile for large aircraft is a problem that has been addressed in the past. A handoff from a missile warning sensor generates reported coordinates for an incoming missile and cues an infrared countermeasure (IRCM) system to slew a type of gimbal to the reported coordinates. An onboard mid-wave infrared (MWIR) camera, sometimes referred to as a tracking camera, searches the region for the incoming missile and directs a narrow laser beam, often just a few milliradians (mrad), to deceive the missile's tracking electronics. The weight, power requirements, and cost of present IRCM systems (including common infrared countermeasure (CIRCM) systems) results in a difficulty in adapting such systems for use in smaller aircraft.

For example, contemporary directed energy infrared countermeasure (DIRCM) systems use a narrow (e.g., much less than one degree) laser beam directed with high accuracy at an incoming missile threat. DIRCM systems thus achieve high radiant-intensity jamming and are able to protect aircraft having large heat signatures. As explained above, these systems are both too heavy and consume too much power to be used for protecting small aircraft, including unmanned aerial vehicles (UAVs).

SUMMARY

The problems noted above are solved in large part by a system including a threat warning system and a countermeasure system. The threat warning system generates threat data that includes at least a threat coordinate value. The countermeasure system includes a wide-angle laser beam director and the counter measure system receives the threat data including the threat coordinate value from the threat warning system and causes the beam director to direct a divergent laser beam based on the threat coordinate value.

The problems noted above may be further solved by a method including receiving threat data from a threat warning system, wherein the threat data comprises at least a threat coordinate value, and causing a wide-angle laser beam director to direct a divergent laser beam based on the threat coordinate value.

The problems noted above may be still further solved by a non-transitory computer-readable medium containing instructions that, when executed by a processor, cause the processor to receive threat data from a threat warning system, wherein the threat data comprises at least a threat coordinate value, and cause a wide-angle laser beam director to direct a divergent laser beam based on the threat coordinate value.

BRIEF DESCRIPTION OF THE DRAWINGS

For a detailed description of exemplary embodiments of the disclosure, reference will now be made to the accompanying drawings in which.

NOTATION AND NOMENCLATURE

Figure 1A:
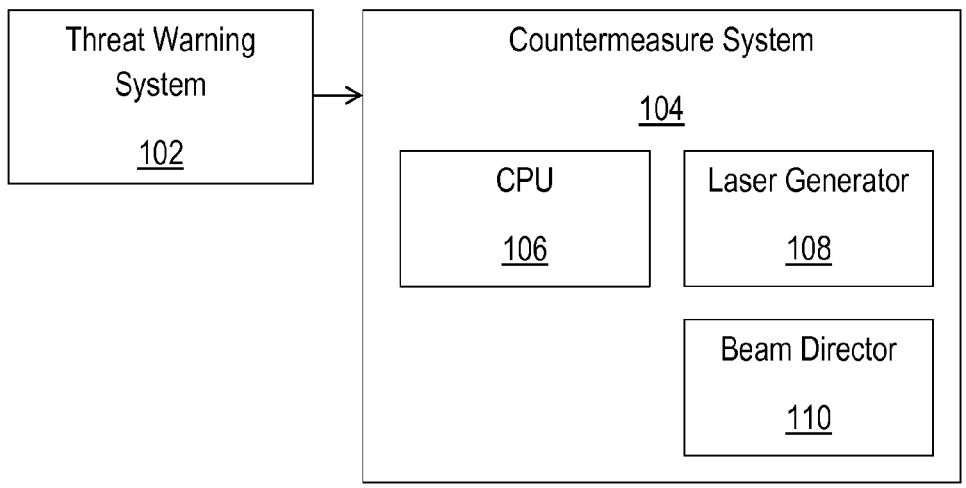
FIG. 1a shows a block diagram of a system in accordance with various embodiments of the present disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. When used in a mechanical context, if a first component couples or is coupled to a second component, the connection between the components may be through a direct engagement of the two components, or through an indirect connection that is accomplished via other intermediate components, devices and/or connections. In addition, when used in an electrical context, if a first device couples to a second device, that connection may be through a direct electrical connection, or through an indirect electrical connection via other devices and connections.

As used herein, the term "unmanned aircraft systems" or UAS refers to all types of unmanned or remotely operated aerial devices, such as remotely operated aircraft, unmanned aircraft, and the like.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The loss of unmanned aircraft systems (UAS) due to missiles, such as surface-to-air (SAM) missiles and more specifically IR-guided missiles, has increased over the years. Although the purpose of a UAS is to avoid the loss of human life, increased countermeasure protection for a UAS is beneficial as it reduces costs due to loss of valuable equipment. As explained above, conventional DIRCM systems utilize a threat warning system, which detects an incoming threat such as a missile and passes threat coordinate information to the IRCM system. The IRCM system then moves a turret based on the received threat coordinate information and uses a tracking camera to continue to track the threat. Once track has been established, the IRCM activates a laser to jam the incoming threat, causing the threat to veer off course and miss the target aircraft. However, the tracking camera and associated electronics are both costly and heavy, rendering such a system unsuitable for use in UAS and other lightweight aircraft.

In accordance with various embodiments of the present disclosure, systems and methods for pseudo-directable jamming, which are both lighter and less complex than conventional directed energy infrared countermeasure (DIRCM) systems, are provided and described in further detail below. Thus, in accordance with various embodiments, the disclosed systems and methods for pseudo-directable jamming are suitable for UAS and other lightweight aircraft for which a conventional DIRCM system is not feasible to implement.

In accordance with various embodiments of the present disclosure, a divergent laser beam (greater than one degree, but less than the quadrants or hemispheres of legacy lamp-based lighthouse jammers) is directed in the general area of a threat's coordinates, which creates a low radiant intensity jamming that is nonetheless sufficient to protect small signature aircraft, such as UAS and other lightweight aircraft. In particular, by generating a laser cone in excess of the typical few mrads, less precision is required in directing the laser beam and a tracking camera and its associated control electronics are not needed or utilized, the present disclosure allows for systems and methods that are both less complex and lighter than conventional DIRCM systems.

Turning now to FIG. 1a, a system 100 is shown in accordance with various embodiments. The system 100 includes a threat warning system 102 coupled to a countermeasure system 104. The threat warning system 102 identifies an incoming threat and various threat attributes, such as its coordinates and an angle of approach value. The threat warning system 102 generates threat data indicative of one or more of such attributes and transmits the threat data to the countermeasure system 104.

Thus, the countermeasure system 104 receives the threat data from the threat warning system 102. The countermeasure system 104 includes a CPU 106, which may include any of various types of hardware processors, programmable logic, and the like. The countermeasure system 104 also includes a laser generator 108 and a beam director 110. The laser generator 108 and beam director 110 combine to generate and direct a divergent laser beam. The countermeasure system 104—for example based on control executed by the CPU 106—causes the laser generator 108 and beam director 110 to generate and direct the divergent laser beam based on a threat coordinate value contained in the received threat data from the threat warning system 102.

Figure 1B:
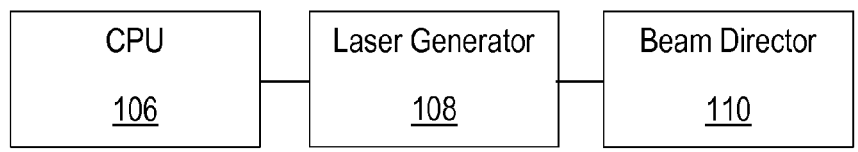
FIG. 1b shows a block diagram of a laser generation and direction system in accordance with various embodiments of the present disclosure.
Figure 1C:
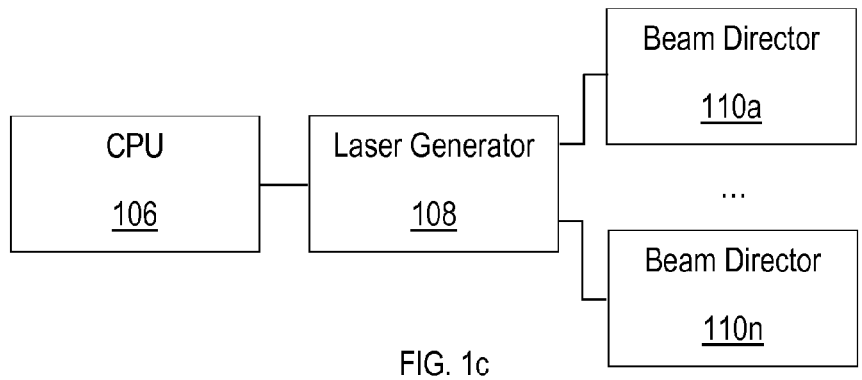
FIG. 1c shows a block diagram of an alternate laser generation and direction system in accordance with various embodiments of the present disclosure.

Turning briefly to FIGS. 1b and 1c, in certain embodiments the system 100 may employ a single beam director 110 as shown in FIG. 1b. However, in other embodiments, the system 100 may employ multiple distributed beam directors 110a-n as shown in FIG. 1c. For example, a single laser 108 may be centrally located in the UAS and used to source a number of beam directors 110a-n located at different positions around the UAS skin, via a fiber optic network for example. The control of the multiple beam directors 110a-n may still be carried out by a single, centrally-located CPU 106.

More broadly, the system 100 shown in FIG. 1 implements pseudo-directable jamming, where a broad cone of laser energy, for example between one and five degrees or in some cases between one and ten degrees, is directed toward the general vicinity indicated by threat coordinate values received from the threat warning system 102. This may be accomplished using a lower-resolution gimbal or other directing technology. For aircraft with a sufficiently small signature, such as UAS or other lightweight aircraft, the resulting countermeasure effect is comparable to a contemporary DIRCM system when used on a large signature aircraft. It is noted that the broad cone of directed laser energy allows for less precision in aiming the laser, both initially and subsequently, and thus the system 100 does not include a tracking camera or its associated control electronics, such as search and tracking logic that. Further, a less-accurate gimbal may be employed relative to conventional DIRCM systems, further saving weight and expense. In particular, the jamming laser power is increased, while other requirements (e.g., precision direction of the laser) may be relaxed. It is noted that the cost and weight of laser generator 108 and beam director 110 scales favorably when considering cost and weight, such that an increase in laser requirements is more than offset by the simplifications offered by eliminating a tracking camera, higher-precision gimbal, and higher-precision direction and tracking electronics. Thus, overall system weight, cost, and complexity are reduced relative to conventional DIRCM systems, while system mean time between failures (MTBF) is increased. Further, the system 100 provides a scalable alternative, which is capable of installation in and protection of small aircraft such as UAVs.

In accordance with various embodiments, the countermeasure system 104 may cause the angle of the cone generated and directed at the target to vary based on the handoff accuracy of the threat warning system 102. Further, other laser requirements and considerations such as startup pointing direction, aircraft platform flexure, system installation accuracy and complexity, and multiband laser cobore requirements may be relaxed relative to conventional DIRCM systems. In some cases, the system 100 utilizes a small gimbal having a large divergence-aperture product. Further, as a result of the laser beam divergence employed by system 100, the coordinate information supplied by the threat warning system 102 may have a lower resolution than is conventionally required. Additionally, no tracking camera is required because there is no need to know where the threat is provided that it falls within the jamming cone of laser energy.

In certain embodiments, the countermeasure system 104 enables a feedback loop between the beam director 110 and the threat warning system 102. As the threat warning system 102 provides updated threat data, including updated threat coordinate values, to the countermeasure system 104, the countermeasure system causes the beam director 110 to update its direction accordingly. Thus, even though no tracking camera is employed, data from the threat warning system 102 may still be leveraged to provide active direction of the jamming cone of laser energy. However, in alternate embodiments (e.g., where the cone angle is sufficiently large that no active direction is needed), the countermeasure system does not alter the direction of the beam director 110 after its initial direction.

It is noted that aircraft signatures are not typically angularly homogeneous. That is, the aircraft signature seen by a threat varies with the threat's angle of approach. For example, the signature is strongly peaked in the directions of the aircraft exhaust ports, while the signature may be relatively small over the rest of the aircraft. Thus, in certain embodiments, an angle of approach value for the threat is included in the threat data generated by the threat warning system 102 and received by the countermeasure system 104. The countermeasure system 104 may cause the beam director 110 to vary an angle of the jamming cone based on the received angle of approach value, for example using a wider cone when the angle of approach value indicates that the signature perceived by the threat is low and a narrower, more focused cone when the angle of approach value indicates that the signature perceived by the threat is high. A lookup table may be utilized by the countermeasure system 104 to associate various angle of approach values with particular jamming cone angles. For example, a first angle of approach value may be associated with a jamming cone angle of three degrees while a second angle of approach value may be associated with a jamming cone angle of seven degrees. It should be appreciated that such a table may be populated based on analysis of the signature of a given aircraft. Further, it should be appreciated that angle of approach entries in the table may correspond to ranges of angles (e.g., 0-89 degrees, 90-179 degrees, 180-269 degrees, and 270-359 degrees) or to single angles.

It is also noted that the laser in a conventional DIRCM system must be of very high mode quality in order to direct a laser beam with a required small divergence. Furthermore, the laser must have good pointing stability at the start of jamming, or a risk of increasing pointing error as the laser warms up becomes unacceptably large. By contrast, the present disclosure utilizes a divergent laser beam 108, 110 and thus neither the laser beam mode nor the initial pointing vector are required to be as accurate as with conventional DIRCM systems. This further reduces requirements on the system 100 and results in a simpler laser with higher wallplug efficiency. Furthermore, the removal of the tracking camera and the substitution of a wide-angle beam director 110 results in an optical system of much lower complexity and weight.

Figure 2:
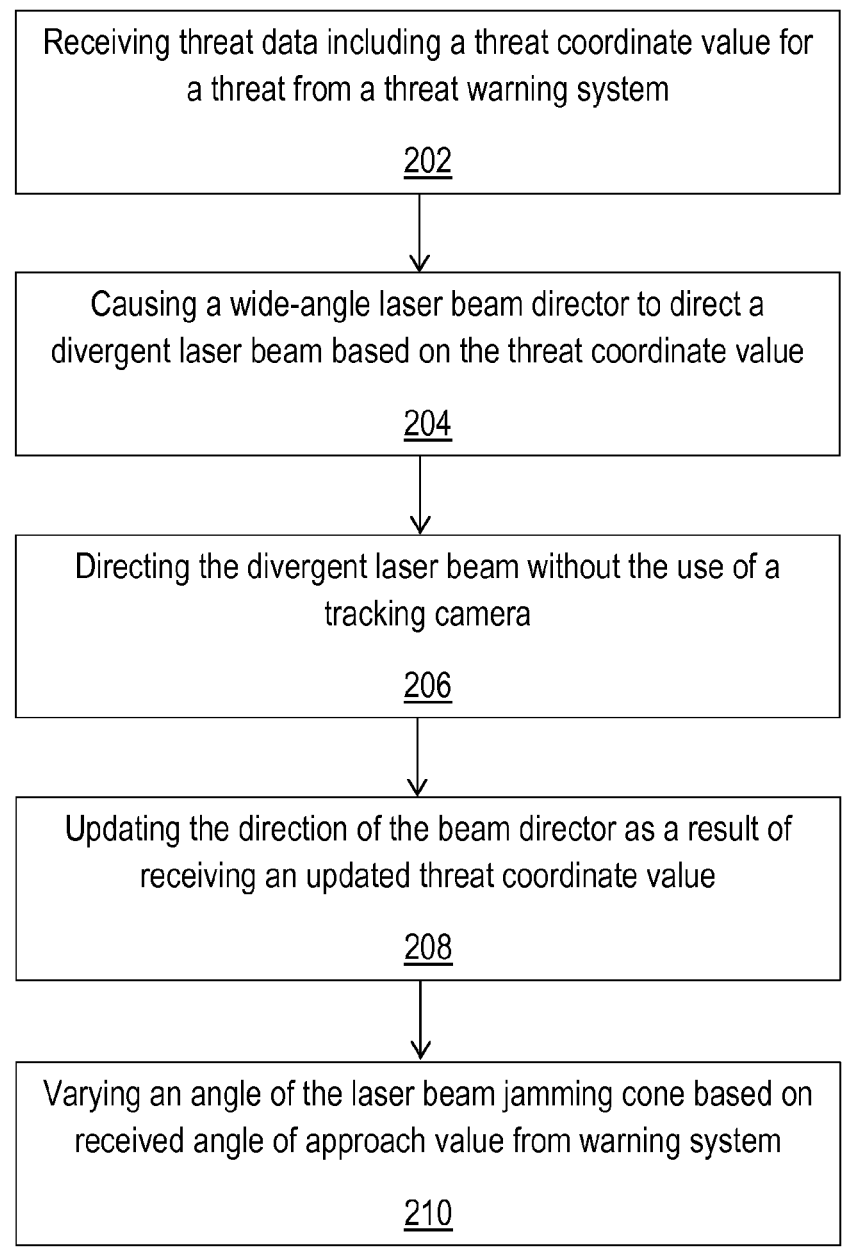
FIG. 2 shows a flow chart of a method in accordance with various embodiments of the present disclosure.

FIG. 2 shows a flow chart of a method 200 in accordance with various embodiments. It should be appreciated that certain steps of the method may be omitted or performed in an order different than shown; further, certain steps may be performed contemporaneously. The method 200 begins in block 202 with receiving threat data including a threat coordinate value for a threat from a threat warning system 102. As explained above, the threat data may include other information as well, but the threat coordinate value is needed by the countermeasure system 104 to institute a jamming countermeasures. The method 200 continues in block 204 with causing a wide-angle laser beam director 108, 110 to direct a divergent laser beam based on the threat coordinate value. A jamming cone of the laser may be in the range of one to five degrees or, in certain embodiments, one to ten degrees or more. As explained above, the use of a tracking camera is not required, and thus the method 200 may continue in block 206 with directing the divergent laser beam without the use of a tracking camera.

In some cases, the method 200 continues in block 208 with updating the direction of the beam director 110 as a result of receiving an updated threat coordinate value from the threat warning system 102. The countermeasure system 104 may complete a feedback loop between the warning system 102 and the beam director for increased jamming effectiveness. Finally, the method 200 may continue in block 210 with varying an angle of the jamming cone based on an angle of approach value indicated by the received threat data from the threat warning system 102. The jamming cone angle may be varied, for example using a wider cone when the angle of approach value indicates that the signature perceived by the threat is low and a narrower, more focused cone when the angle of approach value indicates that the signature perceived by the threat is high. A lookup table may be utilized to associate various angle of approach values with particular jamming cone angles. For example, a first angle of approach value may be associated with a jamming cone angle of three degrees while a second angle of approach value may be associated with a jamming cone angle of seven degrees. It should be appreciated that such a table may be populated based on analysis of the signature of a given aircraft. Further, it should be appreciated that angle of approach entries in the table may correspond to ranges of angles (e.g., 0-89 degrees, 90-179 degrees, 180-269 degrees, and 270-359 degrees) or to single angles.

Figure 3:
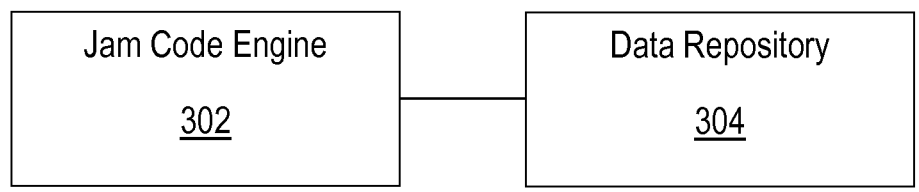
FIG. 3 shows a view of a countermeasure system in accordance with various embodiments of the present disclosure.

FIG. 3 shows another view of the countermeasure system 104 in accordance with various embodiments. The countermeasure system 104 includes a laser direction engine 302 and a data repository 304 coupled to the laser direction engine 302. The laser direction engine 302 is a combination of programming and hardware to execute the programming. Although shown as a single engine, the functionality of the laser direction engine 302 may be distributed across multiple platforms. For example, the laser direction engine 302 may be implemented using either a common processor and memory, or may be applied across multiple processors and/or memories. Additionally, the programming that enables the functionality of the laser direction engine 302 may be included in the same executable file or library or across multiple executable files or libraries.

The laser direction engine 302 receives threat data from a threat warning system, such as threat warning system 202 described above with respect to FIG. 1. The threat data includes at least a threat coordinate value, but may also include an angle of approach value, for a threat such as a missile. The laser direction engine 302 causes a wide-angle laser beam director 110 to direct a divergent laser beam based on the threat coordinate value included with the threat data. Further, the laser direction engine 302 may direct the divergent laser beam without the use of a tracking camera and associated electronics. In some cases, the laser direction engine 302 updates the direction of the beam director 110 as a result of receiving an updated or different threat coordinate value from a threat warning system such as threat warning system 102 described above.

In some cases, the laser direction engine 302 varies an angle of the laser beam jamming cone based on a received angle of approach value from the threat warning system 102. A lookup table may be utilized to associate various angle of approach values with particular jamming cone angles. The lookup table may be store in, for example, the data repository 304. The data repository 304 may store threat data received from the threat warning system 102 prior to the laser direction engine 102 performing the above described functionality, and may generally store any data generated or received by the countermeasure system 104.

Figure 4:
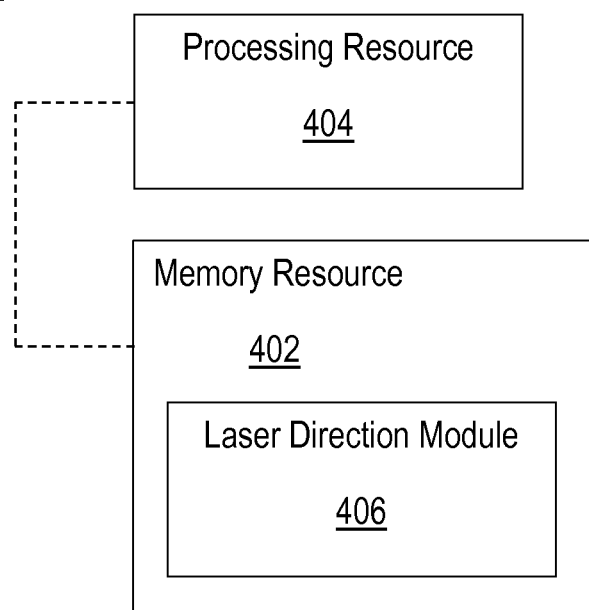
FIG. 4 shows another view of the countermeasure system in accordance with various embodiments of the present disclosure.

FIG. 4 shows another example of the countermeasure system 104 in accordance with various embodiments. The countermeasure system 104 includes a memory resource 402 coupled to a processing resource 404. The processing resource 404 is one or more local or distributed processors. The memory resource 402 includes one or more local or distributed memory devices and comprises a laser direction module 406. Thus, the memory resource 402 and the processing resource 404 are hardware components of the countermeasure system 104.

The laser direction module 406 represents instructions that, when executed by the processing resource 404, implement an associated engine. For example, when the laser direction module 406 is executed by the processing resource 404, the above-described laser direction engine 302 functionality is implemented. The laser direction module 406 may also be implemented as an installation package or packages stored on the memory resource 402, which may be a computer-readable medium such as a CD/DVD or a server from which the installation package may be downloaded. Additionally, in some embodiments, the above-described functionality may be implemented in an application-specific integrated circuit (ASIC), a combination of an ASIC and software, or an application-specific instruction-set processor (ASIP).

In accordance with the above-described embodiments and examples, the use of a divergent laser beam for jamming countermeasures represents a departure from conventional jamming geometry, which relies on very small divergence in the case of conventional DIRCM or very broad angles in the case of conventional lighthouse-style jammers. This new jamming geometry permits removal of tracking cameras (and their supporting processing electronics) required by conventional DIRCM systems, which results in a lower overall weight and electrical power requirements, enabling IRCM protection for correspondingly smaller platforms such as UAS and other lightweight aircraft. Further, the beam director(s) may be simplified as accuracy becomes less important as the jamming cone angle increases, and other laser requirements may also be relaxed. The above-described embodiments and examples result in systems and methods that may be employed to provide IRCM protection in small platforms, which were previously unable to support the weight and input electrical power needs of a conventional DIRCM system.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
a threat warning system to generate threat data, wherein the threat data comprises at least a threat coordinate value and an angle of approach value for a threat; and
a countermeasure system comprising a wide-angle laser beam director, wherein the countermeasure system is configured to:
receive the threat data including the threat coordinate value from the threat warning system;
cause the beam director to direct a divergent laser beam comprising a jamming cone of light based on the threat coordinate value; and
cause the beam director to vary an angle of the cone based on the angle of approach value.

2. The system of claim 1 wherein the divergent laser beam comprises a jamming cone of light in the range of one degree to five degrees.

3. The system of claim 1 wherein the divergent laser beam comprises a jamming cone of light in the range of one degree to ten degrees.

4. The system of claim 1 wherein the countermeasure system directs the divergent laser beam without the use of a tracking camera.

5. The system of claim 1 wherein the countermeasure system provides a feedback loop between the beam director and the threat warning system and updates the direction of the beam director based on an updated threat coordinate value received from the threat warning system.

6. The system of claim 1 wherein the countermeasure system does not alter the direction of the beam director after initial direction.

7. A method, comprising:
receiving threat data from a threat warning system, wherein the threat data comprises at least a threat coordinate value and an angle of approach value for a threat;
causing a wide-angle laser beam director to direct a divergent laser beam comprising a jamming cone of light based on the threat coordinate value, and
causing the beam director to vary an angle of the cone based on the angle of approach value.

8. The method of claim 7 wherein the divergent laser beam comprises a jamming cone of light in the range of one degree to five degrees.

9. The method of claim 7 wherein the divergent laser beam comprises a jamming cone of light in the range of one degree to ten degrees.

10. The method of claim 7 further comprising directing the divergent laser beam without the use of a tracking camera.

11. The method of claim 7 further comprising updating the direction of the beam director as a result of receiving an updated threat coordinate value from the threat warning system.

12. A non-transitory computer-readable medium containing instructions that, when executed by a processor, cause the processor to:
receive threat data from a threat warning system, wherein the threat data comprises at least a threat coordinate value and an angle of approach value for a threat;
cause a wide-angle laser beam director to direct a divergent laser beam comprising a jamming cone of light based on the threat coordinate value; and
cause the beam director to vary an angle of the cone based on the angle of approach value.

13. The non-transitory computer-readable medium of claim 12 wherein the divergent laser beam comprises a jamming cone of light in the range of one degree to five degrees.

14. The non-transitory computer-readable medium of claim 12 wherein the divergent laser beam comprises a jamming cone of light in the range of one degree to ten degrees.

15. The non-transitory computer-readable medium of claim 12 wherein the processor further directs the divergent laser beam without the use of a tracking camera.

16. The non-transitory computer-readable medium of claim 12 wherein the processor further updates the direction of the beam director as a result of receiving an updated threat coordinate value from the threat warning system.

* * * * *